Oct. 7, 1941.   A. ALLAN ET AL   2,258,529
METAL-CLAD ELECTRIC SWITCHGEAR
Original Filed Nov. 14, 1938    8 Sheets-Sheet 1

INVENTORS
A. Allan
F. Coates
BY
Watson, Cole, Grindle & Watson
ATTORNEYS

Oct. 7, 1941.  A. ALLAN ET AL  2,258,529
METAL-CLAD ELECTRIC SWITCHGEAR
Original Filed Nov. 14, 1938   8 Sheets-Sheet 4

INVENTORS
A. Allan
F. Coates
BY
Watson, Cole, Grindle & Watson
ATTORNEYS

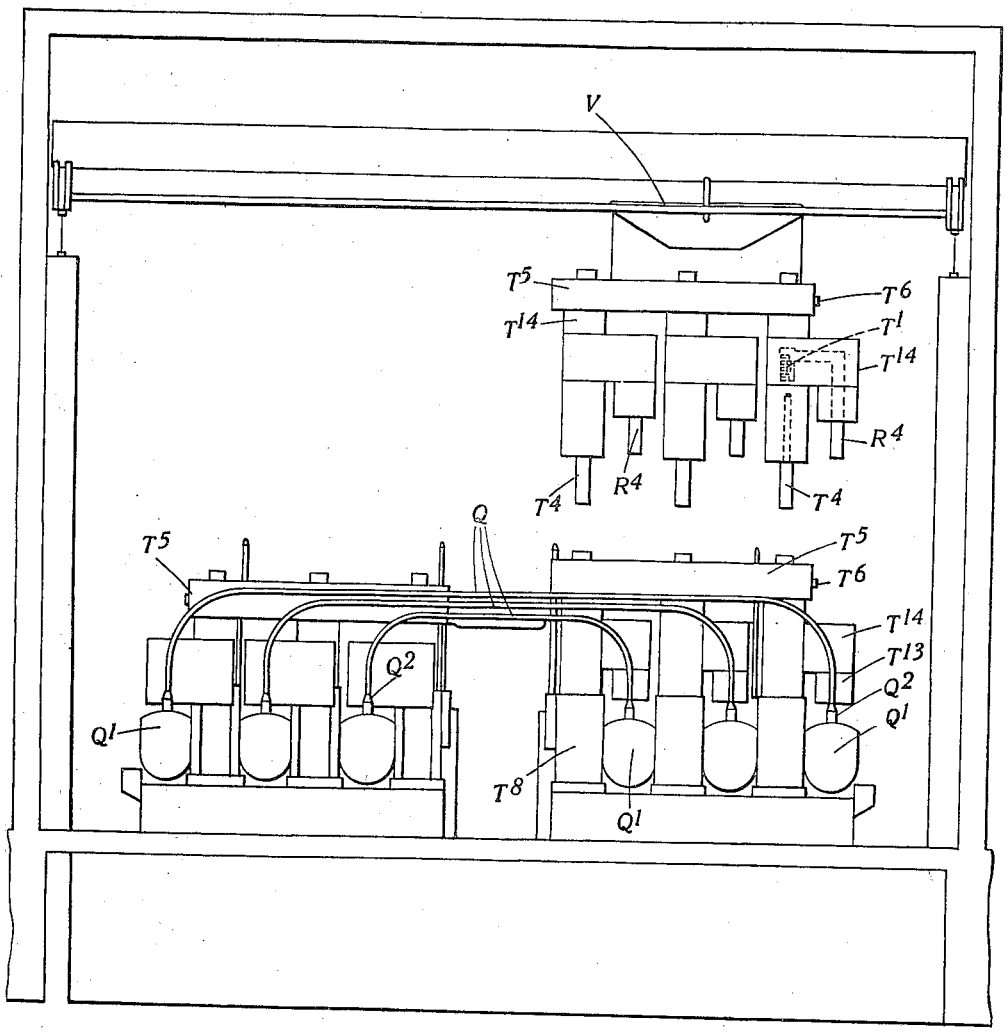

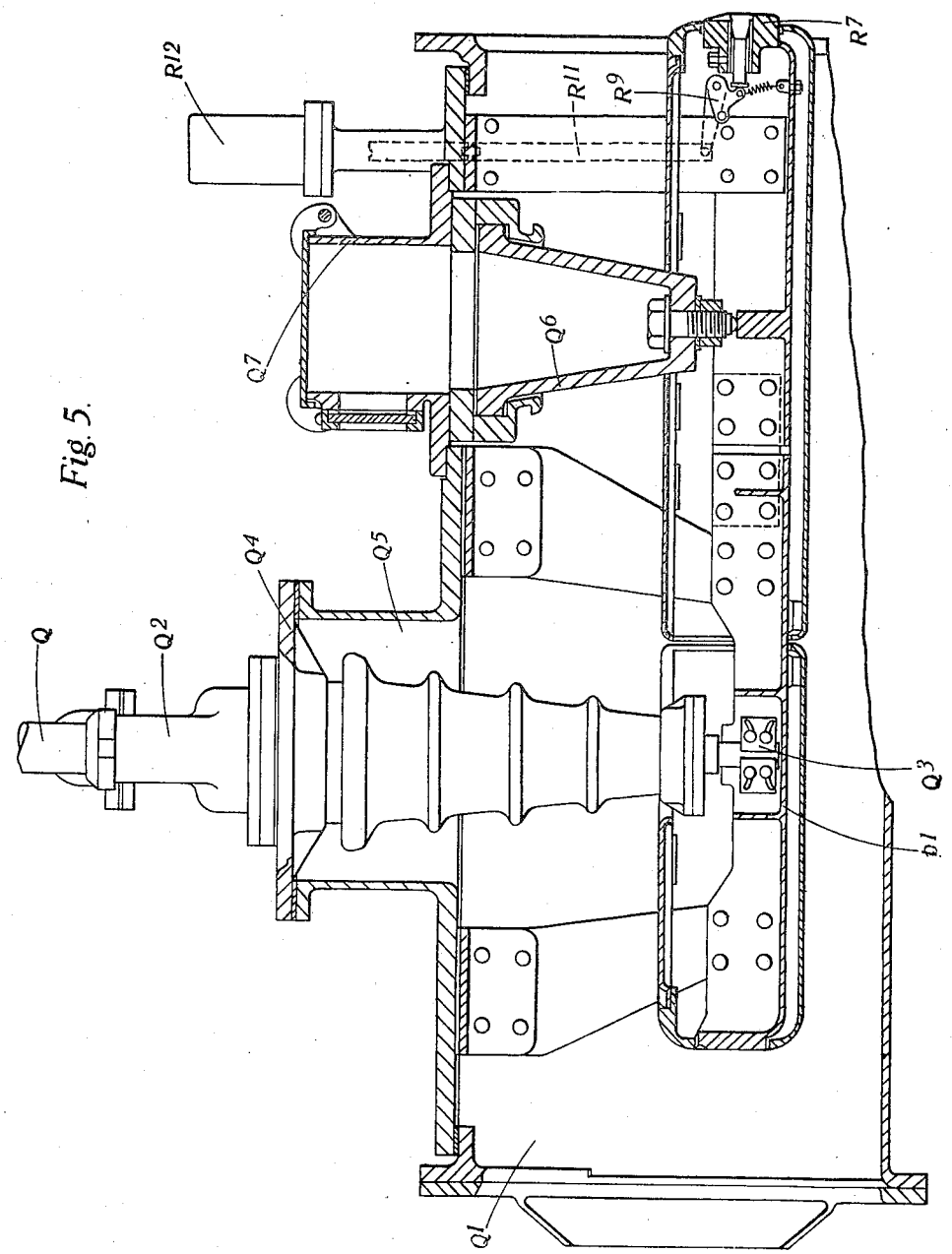

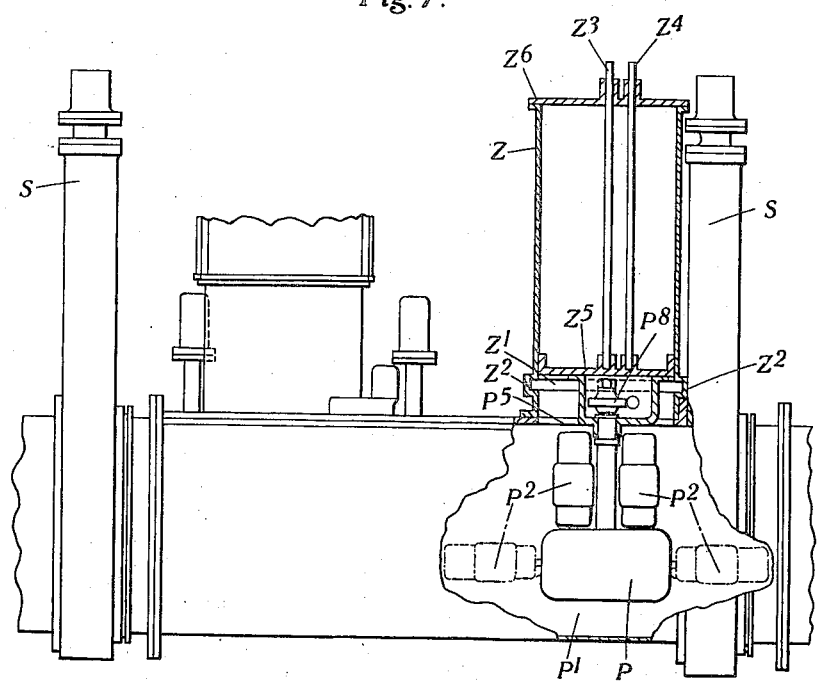

Patented Oct. 7, 1941

2,258,529

UNITED STATES PATENT OFFICE 2,258,529

METAL-CLAD ELECTRIC SWITCHGEAR

Archibald Allan, Whitley Bay, and Frank Coates, Cleadon, England, assignors to A. Reyrolle & Company, Limited, Hebburn-on-Tyne, England, a company of Great Britain Original application November 14, 1938, Serial No. 240,414. Divided and this application August 21, 1939, Serial No. 291,278. In Great Britain November 15, 1937

15 Claims. (Cl. 175—298)

This invention relates to metal-clad electric switchgear and has been divided from the application Serial No. 240,414 filed on November 14, 1938, now Patent No. 2,229,627.

An object of the invention is to provide metal-clad electric switchgear comprising a plurality of chambers containing a plurality of busbar sections and sectionalising switches for connecting the said sections together to form a closed ring, external circuits being T-connected to the busbar sections between the sectionalising switches which cooperate with the busbar sections to form a continuously straight busbar therewith.

Although the use of oil as the insulating medium in switchgear has advantages, it is open to objection on the ground of inflammability and the presence of large bodies of oil in the switchgear (more especially for the higher ranges of voltage) is undesirable, notwithstanding the enclosure of such bodies of oil in separate strong metal casings, in view of the risk of fire spreading to dangerous proportions.

A further object of the invention is to eliminate or materially reduce risk of a dangerous fire by filling the chamber or each chamber with an insulating gas whose dielectric strength within the chamber appreciably exceeds that of air at atmospheric pressure.

According to yet a further object of the invention dry air at a pressure above atmospheric pressure, or nitrogen, carbon dioxide, or other gas which will not support combustion, or a chemically inert gas such as argon is employed as the insulating gas.

Another object of the invention is to employ, as the insulating gas, a gaseous fluorinated chloro-paraffin, for example dichloro-difluoro-methane, at or above atmospheric pressure.

Figure 1:
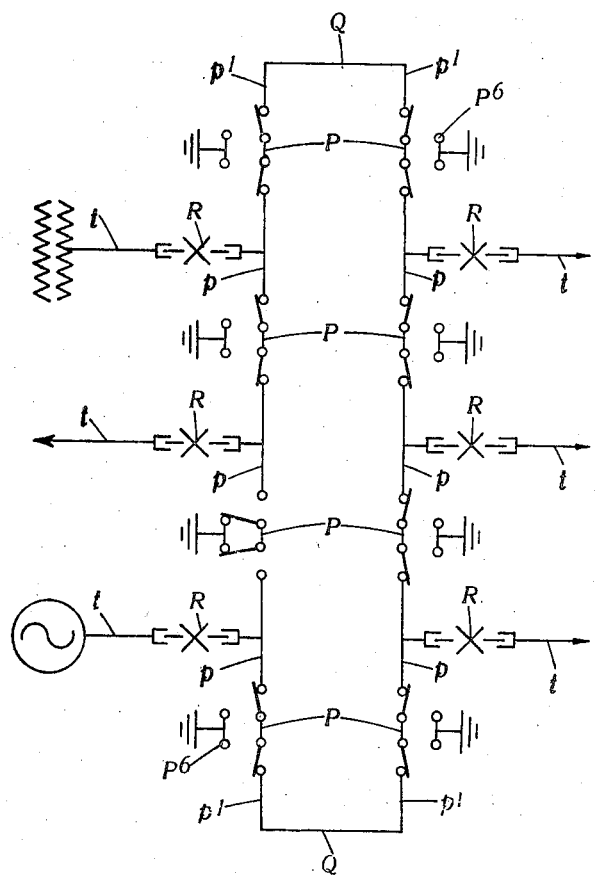
Figure 2:
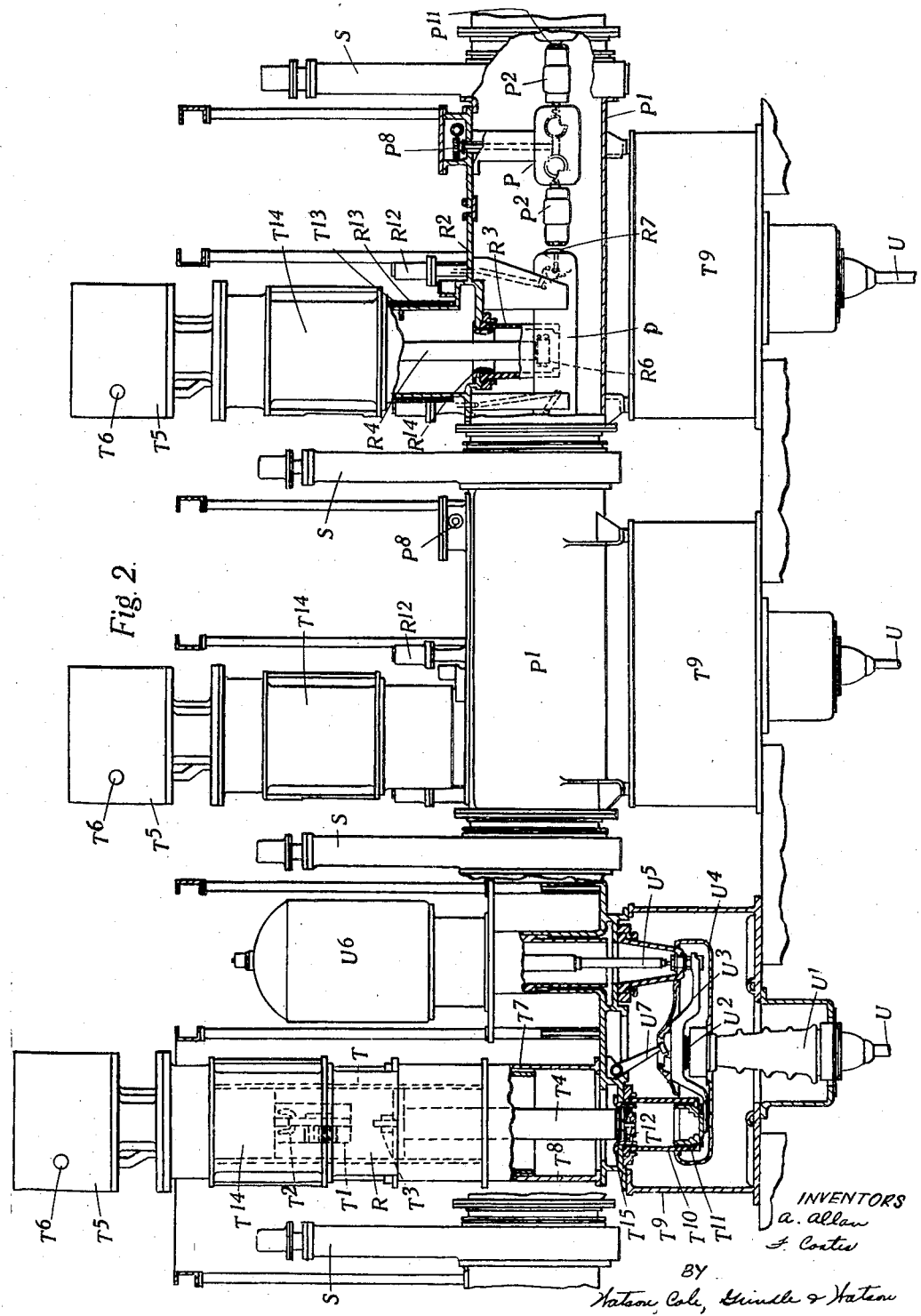
Figure 3:
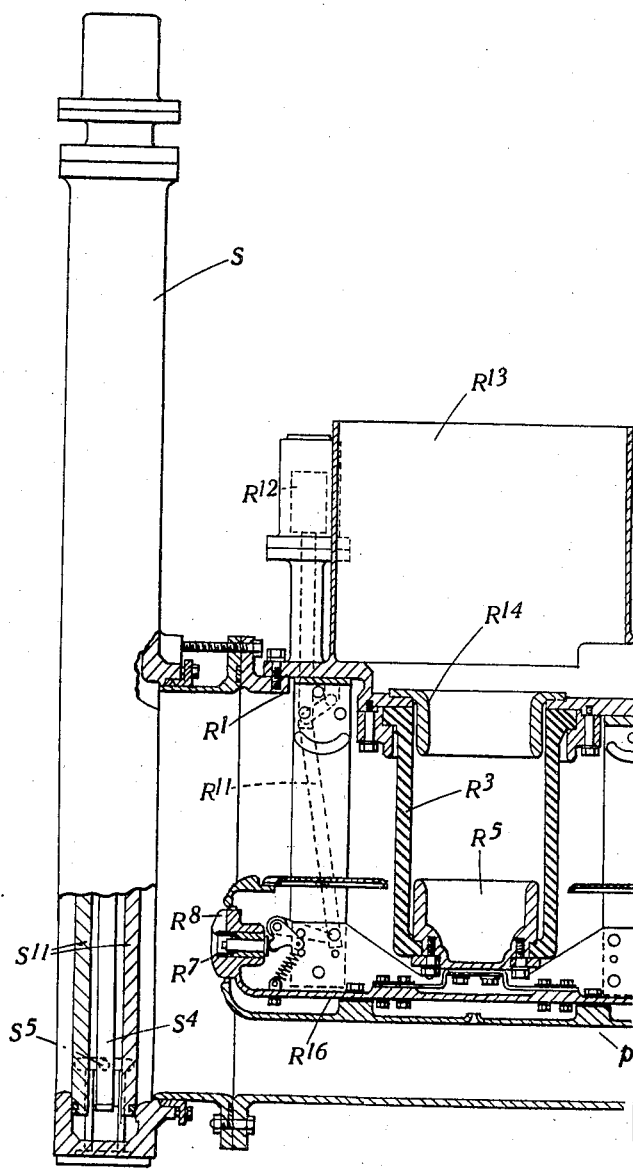
Figure 3A:
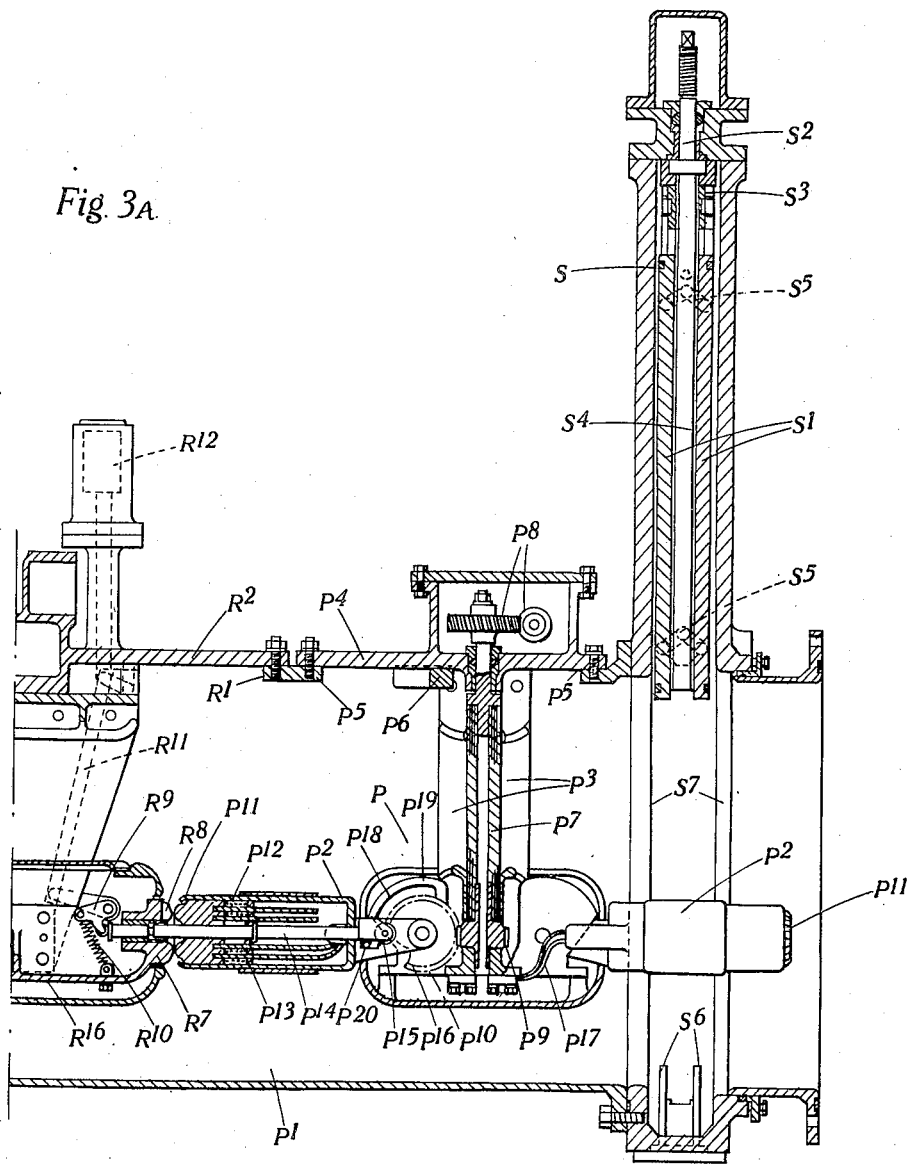
Figure 6:
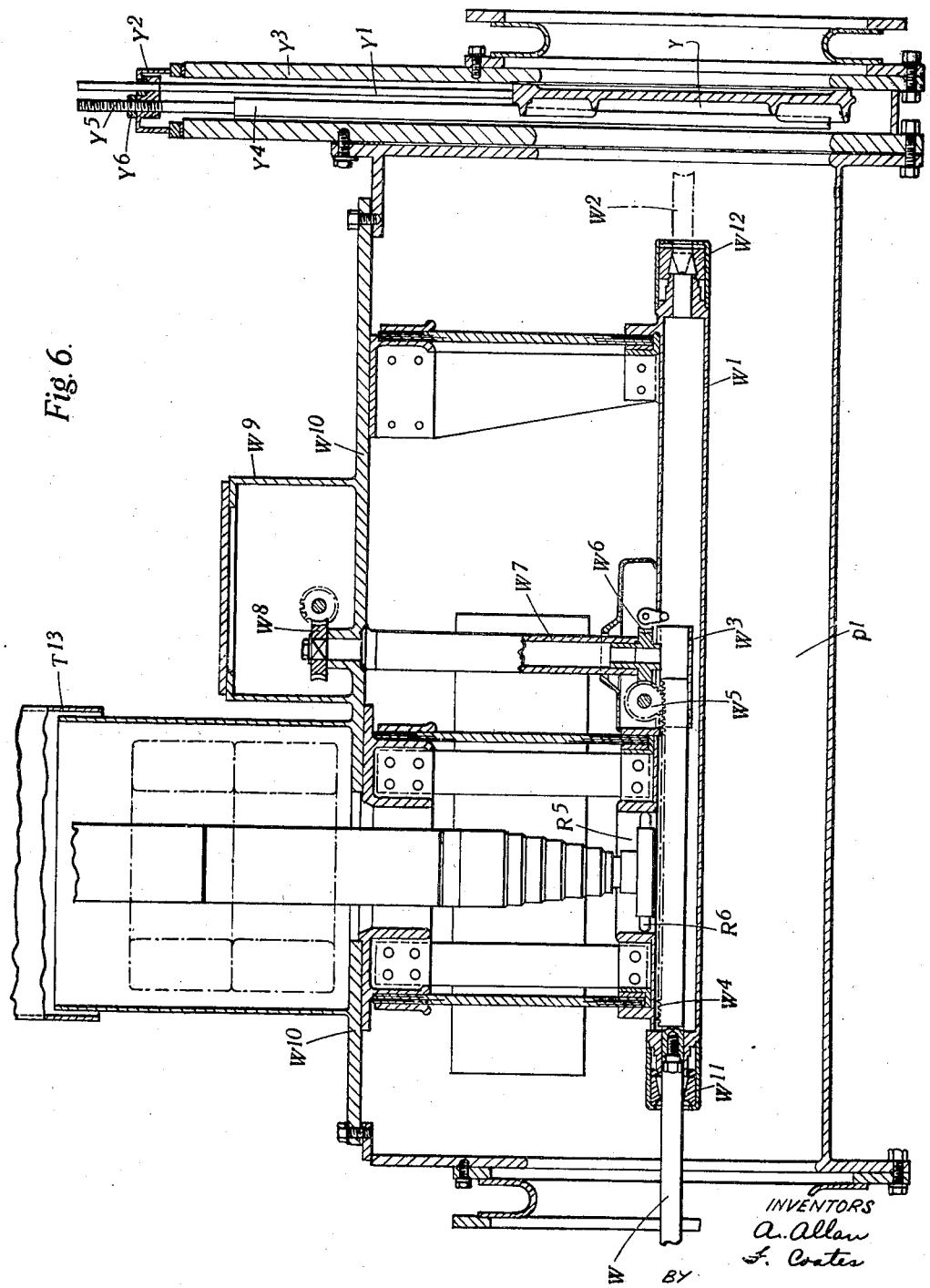

These and further objects of the invention will be apparent from the following description of the accompanying drawings which illustrate some practical embodiments of the invention, and wherein, Figure 1 is a diagram representing ring busbar switchgear incorporating the invention, Figure 2 illustrates, partly in vertical section, three-phase switchgear included in the arrangement shown in Figure 1, Figure 3 is a section, on an enlarged scale, of the isolating switch, sluice valves and circuit-breaker orifice insulator associated with one busbar chamber, Fig. 3A illustrates in section a form of sectionalising switch and associated sluice valve, Figure 4 is an end elevation of the gear shown in Figures 2 and 3, with the circuit-breakers in one panel raised for inspection or repair, Figure 5 shows one end chamber on an enlarged scale in vertical section, Figure 6 illustrates in section a modified form of sectionalising switch and associated sluice valve, and Figure 7 shows one busbar chamber, as included in Figures 2 and 3, furnished with a subsidiary casing into which the sectionalising switch can be withdrawn.

In the arrangement shown diagrammatically in Figure 1 a number of busbar sections $p$, $p^1$ are connected together by isolating switches P into the form of a normally closed ring, and feeder or other external circuits $t$ are T-connected respectively to the individual sections, each such circuit being controlled by a circuit-breaker R whilst the ring is completed by end connections Q.

As shown in Figures 2 and 3 each busbar section is housed in a metal chamber $P^1$ of tubular construction, connected at each end to a valve chest S containing a sluice valve $S^1$. The sluice valves $S^1$ are normally open as shown to the right in Figure 3, thus leaving the busbar chamber $P^1$ in open communication with the adjoining busbar chambers, but can be closed to shut off such communication. The busbar chambers $P^1$ are filled with air or other gas at a pressure of, say, two atmospheres or with other gas, such for example as a gaseous fluorinated chloro-paraffin, at or above atmospheric pressure. Each sluice valve comprises a spindle $S^2$ in screwthreaded engagement with a nut $S^3$ carried by a cross-bar connected at opposite ends through rods $S^4$ and toggles $S^5$ to two opposed plates $S^1$ constituting the sluice valve proper. By rotating the spindle $S^2$ the cross-bar and rods $S^4$ are moved downwards in the valve chest S until the plates $S^1$ engage stops $S^6$ whereby the continued downward movement of the rods $S^4$ causes the toggles $S^5$ to be straightened out and the plates $S^1$ are forced apart into fluid-tight engagement with the opposite walls $S^7$ of a channel formed by the valve chest S. The sluice valves $S^1$ may be operated pneumatically, for example by providing each valve with a piston-like enlargement sliding over the walls of the valve chest whilst a pump is employed to control the gas pressures on the two sides of such piston. Alternatively the gas pressure in the busbar chambers may be used for this purpose.

Each busbar chamber $P^1$ has an orifice $R^1$ at the top closed by a detachable cover plate $R^2$, from which a hollow insulator $R^3$ projects downwardly into the chamber $P^1$. The insulator $R^3$ constitutes an orifice insulator for the reception of a bushing $R^4$ projecting downwardly from the associated circuit-breaker R, the lower end of the insulator $R^3$ being closed by a metal contact member $R^5$ with which a contact $R^6$ on the lower end of the circuit-breaker bushing $R^4$ co-operates.

Each circuit-breaker is of the vertical draw-out type comprising an oil-filled circuit-breaker tank T containing an arc-control device $T^1$ housing the fixed circuit-breaker contacts $T^2$, the movable circuit-breaker contact being constituted by a longitudinally movable rod $T^3$ housed in a cylinder within a bushing $T^4$. The rod $R^3$ is operated hydraulically by supplying oil under pressure from an hydraulic actuating piston arranged in a cylinder immersed in the oil within a reservoir $T^5$, the said hydraulic piston being operated by means of a rod $T^6$. An extension $T^7$ carried by the circuit-breaker casing telescopes with a cylindrical flange $T^8$ carried by a feeder chamber $T^9$ and surrounding an orifice therein containing an orifice insulator $T^{10}$ which in turn contains a feeder contact $T^{11}$ for cooperation with the isolating contact $T^{12}$ at the lower end of the bushing $T^4$. Each of the fixed contacts $T^2$ is electrically connected through the tank T to the busbar isolating conductor in the associated bushing $R^4$. Thus, after opening the circuit-breaker R isolation can be effected by raising the circuit-breaker together with the tank T and bushing $T^4$ as shown to the left in Figure 2, the corresponding bushing $R^4$ being raised with the circuit-breaker so that the isolating contacts $T^{12}$, $R^6$ are isolated from the feeder and busbar contacts $T^{11}$, $R^5$. Each bushing $R^4$ lies within a tubular casing $T^{13}$ carried by the other casing of the circuit-breaker and telescoping with a flange $R^{13}$ formed on the cover plate $R^2$ around the orifice insulator $R^3$.

The annular space between each oil-filled circuit-breaker tank T and the outer casing $T^{14}$ is filled with air under pressure, or with other gas, for example a gaseous fluorinated chloro-paraffin, at or above atmospheric pressure. Instead of employing an oil-immersed circuit-breaker, however, this may be of the gas-blast type. Each feeder or other external circuit U enters the chamber $T^9$ through a lead-in bushing $U^1$ and carries butt contacts $U^2$ which cooperate with a bridging member $U^3$ arranged in a casing $U^4$ and connected at one end to the feeder isolating contact $T^{11}$ and at the other end through an insulated conductor $U^5$ to a potential transformer arranged in a casing $U^6$. The feeder chamber $T^9$ may be filled with air under pressure, or with other gas, for example a gaseous fluorinated chloro-paraffin, at or above atmospheric pressure.

When the circuit-breakers are raised into their isolating positions the contacts $T^{12}$ and $R^6$ cooperate with earthing contacts $T^{15}$ and $R^{14}$ and a manually operated earthing switch $U^7$ is moved into the position shown to the left in Figure 2 so as to earth the feeder U. It will be appreciated that in Figure 2 the left-hand circuit-breaker is shown partly in vertical section through the centre of the circuit-breaker panel whereas the right-hand circuit-breaker is shown partly in vertical section through the busbar chamber which lies to one side of the panel centre.

Each of the orifice insulators $R^3$, $T^{10}$ is preferably filled with oil or other insulating liquid, in order to avoid the greater electrical clearance distances necessary when the insulator is filled with air at atmospheric pressure. Compressed air, or other gas such for example as a gaseous fluorinated chloro-paraffin at or above atmospheric pressure, may however be employed in the orifice insulators, if desired, the arrangement being such that a gas-tight joint is normally maintained between the telescoping parts $T^{13}$, $R^{13}$, and $T^7$, $T^8$, not only when the circuit-breaker is in its lowermost or operative position, but also when it has been raised into its isolating position, so that the interior of the orifice insulators $R^3$, $T^{10}$ need only be opened to the atmosphere when the circuit-breaker R is to be completely removed from the gear for overhaul or repair.

A conductor $R^{16}$ extends horizontally on both sides of the contact member $R^5$, constitutes the busbar section p, and is provided with contacts $R^7$ at its ends for cooperation with the busbar sectionalising switches P. The cover plate $R^2$ at the top of the busbar chamber $P^1$ is of such a size and shape as to permit the orifice insulator $R^3$ or insulating plates and the busbar section including the two conductors $R^{16}$ to be withdrawn together from the busbar chamber $P^1$, when desired, together with the cover plate $R^2$ itself, the circuit-breaker R having first been removed as in Figure 3.

Each sectionalising switch P is arranged near one end of the corresponding busbar chamber $P^1$, the switch, when in its operative position shown in Figure 3, projecting through the opening in the adjacent valve chest and serves to connect the busbar section p in the chamber $P^1$ itself with the busbar section in the adjoining busbar chamber, but can be withdrawn from the adjoining chamber into an isolating position, whereupon the sluice valve $S^1$ can be closed. Each busbar sectionalising switch P comprises two pivoted arms $P^2$ supported on two insulating plates one of which is shown at $P^3$ suspended from a lid or cover $P^4$ closing a second orifice $P^5$ in the top wall of the chamber $P^1$, the arms $P^2$ in the operative position extending substantially horizontally as shown in Figure 3 in opposite directions from the bottom of the insulating plates $P^3$, whilst in the isolating position they lie substantially vertically between or close to such plates (as shown in Figure 7) and engage with earthed contacts one of which is shown at $P^6$. This arrangement enables the arms $P^2$ to be withdrawn vertically with the insulating plates $P^3$ through the orifice $P^5$ for inspection or maintenance, the sluice valves $S^1$ at the two ends of the chamber $P^1$ having first been closed to cut off access to all live parts in the adjoining busbar chambers and also to prevent escape of insulating gas therefrom. Thus when one busbar chamber is opened up for maintenance purposes, only the gas in such chamber can escape, the parts in the other chambers remaining in service.

For actuating the two pivoted arms $P^2$ a rotatable insulating tube $P^7$ is provided between the two supporting plates $P^3$, this tube being connected at its upper end to suitable actuating mechanism $P^8$ outside the chamber. At the lower end the tube $P^7$ carries a helical gear wheel $P^9$ engaging with helically toothed pinions $P^{10}$ on the pivoted arms. Each arm $P^2$ carries at its free end plunger contacts $P^{11}$ loaded by springs $P^{12}$ which abut against a member $P^{13}$ engaged by a flange formed on a plunger $P^{14}$. The plunger $P^{14}$ is longitudinally movable in the arm $P^2$ and carries a roller $P^{15}$ which bears against a cam $P^{16}$ on the corresponding pinion $P^{10}$. The contacts $P^{11}$ on the two arms are electrically connected together by flexible leads $P^{17}$, the contacts $P^{11}$ cooperating with the contacts $R^7$ on the ends of the busbar sections.

When the arms $P^2$ are in their raised or isolating position an arcuate flange $P^{18}$ on a fixed disc $P^{19}$ engages a stud $P^{20}$ carried by the corresponding plunger $P^{14}$ and retains this in the retracted position in which the roller $P^{15}$ lies in the reentrant part of the cam $P^{16}$. To close the switch the tube $P^7$ is rotated by the mechanism $P^8$ so that the arms $P^2$ turn downwards about the centres of rotation of the pinions $P^{10}$ as pivots. As the arms approach their horizontal positions the free end of each plunger $P^{14}$ passes downwards through a slot $R^8$ in the fixed contact $R^7$ whereupon the stud $P^{20}$ clears the lower end of the flange $P^{18}$ so that the plunger $P^{14}$ is released and the roller $P^{15}$ rides up the associated cam $P^{16}$. The plunger $P^{14}$ is thus moved to the left as viewed in the drawing and the abutment member $P^{13}$ compresses the springs $P^{12}$, each plunger $P^{14}$ being thus locked in position in the contact $R^7$ with which the contacts $P^{11}$ are pressed firmly in engagement. The plunger $P^{14}$ also turns a bell-crank lever $R^9$ against the action of a spring $R^{10}$ to act through a link $R^{11}$ on an indicator $R^{12}$. If now the mechanism $P^8$ is operated to open the isolating switch $P$ the pinions $P^{10}$ first turn without lifting the arms $P^2$ since the rollers ride down into the reentrant parts of the cams $P^{16}$, thus retracting the plungers $P^{14}$. The pressure of the contact springs $P^{12}$ is thus relaxed and the plunger $P^{14}$ withdrawn so that as the continued rotation of the pinions $P^{10}$ commences to lift the arms $P^2$ the free ends of the plungers $P^{14}$ pass upwards through the slots $R^8$. The studs $P^{20}$ now lie inside the arcuate flanges $P^{18}$ and, when the arms $P^2$ reach their fully raised positions, the plungers $P^{14}$ cooperate with the earthing contacts $P^6$ and the adjacent sluice valve $S^1$ can be closed.

The busbar chambers are arranged in two lines for each phase, special end chambers $Q^1$ (Figure 4) being provided having cross-connections $Q$ completing the ring for each phase. In Figure 4 the circuit-breakers of one panel are shown fully raised by a crane $V$, for repair or inspection, the busbar isolating bushings $R^4$ and feeder isolating bushings $T^4$ being wholly withdrawn from the fixed portion of the gear.

Figure 5 is a longitudinal section, on an enlarged scale, of one of the end chambers $Q^1$ containing a busbar section $p^1$ furnished at one end with a fixed contact $R^7$ and associated indicator mechanism $R^9$, $R^{11}$, $R^{12}$ as above described. A cable sealing end $Q^2$ enters the busbar chamber $Q^1$ and makes direct contact as shown at $Q^3$ with the busbar section $p^1$, the cross-connection $Q$ between the two lines of busbar chambers being taken from the cable sealing end $Q^2$. The sealing end $Q^2$ is mounted on a detachable cover $Q^4$ so that it can be withdrawn through an opening $Q^5$ in the busbar chamber $Q^1$. An orifice insulator $Q^6$ closed by a chamber $Q^7$ is provided for the reception of a testing bushing for injecting testing current into the busbar section, for example to test metering or protective current transformers on the associated circuit-breaker panel. The provision of the sluice valves between the busbar chambers facilitates extension of the gear to include additional busbar sections and T-connections.

For extending the gear, all that is necessary is to isolate two of the end chambers $Q^1$ containing the end sections $p^1$ and to remove these chambers with the cross-connection $Q$, then inserting additional busbar chambers and sluice valves $S^1$, with the associated circuits, and replacing the end chambers $Q^1$ beyond the additional chambers. When the additional chambers and the end chambers $Q^1$ have been filled with the insulating gas, the sluice valves $S^1$ can be opened and the new chambers put into commission. The whole extension operation can thus be carried out without putting the rest of the switchgear out of service. Instead of employing cable sealing ends for the cross-connections, these cross-connections may be provided by orifice insulators in the end chambers $Q^1$ for the reception of cross-connecting bushings.

A modified form of sectionalising switch is shown in Figure 6 in which the switch, instead of being separately removable from the bus bar chamber is incorporated with the busbar section in the chamber to form a single unit removable from the chamber. In this case the sectionalising switch is constituted by a longitudinally movable conductor $W$, which normally projects horizontally from the busbar chamber $P^1$ into the next chamber to engage with the busbar section $W^1$ therein as shown at $W^2$ but can be withdrawn from such chamber to break the connection. The busbar section $W^1$ is tubular and is furnished with an internal guide $W^3$ for the conductor $W$ which is provided with a rack $W^4$ for cooperating with a pinion $W^5$ driven by a toothed wheel $W^6$ on the lower end of an operating rod $W^7$ which can be rotated by mechanism $W^8$. The pinion $W^5$ projects through a slot in the top of the tubular busbar section $W^1$ to engage the rack $W^4$, the mechanism $W^8$ being housed in a casing $W^9$ on the top of the detachable cover plate $W^{10}$ of the busbar chamber. The tubular busbar section $W^1$ carries spring finger contacts $W^{11}$, $W^{12}$ at its ends, the contacts $W^{11}$ remaining permanently in sliding engagement with the conducting rod $W$ throughout the full movement of the sectionalising switch, whilst the contacts $W^{12}$ serve for engaging with the projecting part of the conductor $W$ in the next chamber. The busbar section $W^1$ is furnished with an isolating contact $R^5$ with which the contact $R^6$ cooperates, the sectionalising switch together with its operating mechanism as a whole being removable (when the switch is in the open position and the circuit-breaker casing $T^{13}$ has been removed) with the cover plate $W^{10}$. The use of a longitudinally sliding sectionalising switch member enables the dimensions of the sluice valves to be materially reduced.

Though the form of sectionalising switch shown in Figure 6 may be employed with gas-filled switchgear and sluice valves as described with reference to Figures 2 to 5, Figure 6 illustrates a form of sluice valve which may be used when the busbar chamber is oil-filled. The sluice valve shown comprises a shutter $Y$ furnished with a spindle $Y^1$ which extends through a cap $Y^2$ closing the upper end of the valve chest $Y^3$, the shutter $Y$ being pressed into the sealing position by a wedge $Y^4$ having a screw-threaded shank $Y^5$ extending through the cap $Y^2$. Normally the shutter $Y$ and wedge $Y^4$ are removed and the cap $Y^2$ placed in position with suitable plugs in the apertures in the cap. In order to close the sluice valve, the cap $Y^2$ is removed and the plugs withdrawn therefrom, the shutter Y and wedge Y⁴ being then dropped in position. The cap Y² is now replaced with the shank Y⁵ and spindle Y¹ extending through the apertures in the cap which is then secured in place and the wedge Y⁴ driven into place. A nut Y⁶ is provided for easing the wedge outwards prior to removal of the sluice valve.

With a view to enabling inspection of any sectionalising switch P without taking out of service other parts in the same or adjoining chambers, a normally closed casing Z (Figure 7) may be provided over the second orifice P⁵ in the wall of the busbar chamber P¹ with an intervening sluice valve Z¹ which can slide in horizontal guides Z², the sectionalising switch P having an extended operating spindle Z³ and a rod Z⁴ for raising and lowering the switch into and out of the casing Z. The movable unit includes a guide Z⁵ which when the movable unit is raised by the rod Z⁴ slides up within the casing Z until the sectionalising switch P lies above the sluice valve Z¹ which can then be moved into its closed position along the guides Z². The cover Z⁶ of the casing Z can now be removed to permit inspection of the sectionalising switch P without loss of insulating gas from the busbar chamber itself, only the small quantity of gas within the casing Z being lost. A similar casing and horizontal sluice valve may be provided for each circuit-breaker bushing R⁴, this bushing projecting downwardly into the busbar chamber P¹ through a gas-tight gland in the upper end of the said casing, so that when the bushing R⁴ is raised into its isolating position the lower end thereof lies above the horizontal sluice valve which can then be closed to permit removal of the circuit-breaker without loss of gas from the busbar chamber.

When gaseous insulation is employed the gas may be dry air or nitrogen or carbon dioxide or argon, at a pressure to suit the gas used, to give the desired dielectric strength. A suitable pressure in the case of air is about two atmospheres. Alternatively the gas may be constituted by a stable halogenated paraffin which is gaseous at ordinary atmospheric temperatures and wherein the whole or a substantial part of the substituted halogen is fluorine. For example a gaseous fluorinated chloro-paraffin may be used as the insulating gas. When a gaseous fluorinated chloro-paraffin is employed as the gas filling, at or above atmospheric pressure, the gas used is preferably dichloro-difluoro-methane but other suitable examples are trichloro-fluoro-methane and dichloro-tetrafluoro-ethane. The gaseous filling may be constituted by a single fluorinated chloro-paraffin or by a gaseous mixture such for example as a mixture of air in equilibrium with the gaseous fluorinated chloro-paraffin, the dielectric strength of this gaseous mixture preferably being at least one and a half times that of air. The gas filling may be provided by the vapour from a fluorinated chloro-paraffin present as a volatile liquid in the chamber or chambers of the switchgear, or in a reservoir communicating with the said chamber or chambers.

What we claim as our invention and desire to secure by Letters Patent is:

1. In metal-clad electric switchgear, in combination, a plurality of metal chambers arranged end to end in at least one row, a plurality of busbar sections arranged in the said metal chambers respectively, sectionalising switches whereby the busbar sections are normally connected together to form a closed ring, and a plurality of circuit-breakers through which external circuits can be T-connected to the busbar sections themselves between the sectionalising switches which, when closed, cooperate with the busbar sections to form in each row a continuously straight busbar.

2. In metal-clad electric switchgear, in combination, at least two collinear busbar chambers each filled with insulating gas whose dielectric strength within the busbar chamber appreciably exceeds that of air at atmospheric pressure, collinear busbars in said chambers, a movable conductor which in its operative position projects through orifices in the chamber walls and connects the two busbars together, means for withdrawing the movable conductor from one of the busbar chambers into an isolating position within the other busbar chamber, and a device for sealing at least one of the two orifices in a gas-tight manner when the movable conductor has been withdrawn into its isolating position.

3. In metal-clad electric switchgear, in combination, a plurality of metal chambers arranged end to end in at least one row, each chamber being filled with a gaseous fluorinated chloro-paraffin, a plurality of busbar sections arranged in the said chambers respectively, sectionalising switches whereby the busbar sections are normally connected together to form a closed ring, and a plurality of circuit-breakers through which external circuits can be T-connected to the busbar sections themselves between the sectionalising switches which, when closed, cooperate with the busbar sections to form in each row a continuously straight busbar.

4. In metal-clad electric switchgear, in combination, at least two collinear busbar chambers normally in open communication with each other and filled with a gaseous fluorinated chloro-paraffin, collinear sections of a sectionalised busbar in said chambers, a movable conductor between each pair of adjacent busbar sections and normally projecting into the two chambers to connect together the busbar sections therein, means for withdrawing the movable conductor from one chamber into the other to break such connection, and a device for sealing the communicating orifice from which the movable conductor has been withdrawn.

5. In metal-clad electric switchgear, in combination, a plurality of chambers normally in open communication with each other and filled with a gas whose dielectric strength within the chambers appreciably exceeds that of air at atmospheric pressure, a section of a sectionalised busbar in each chamber, a movable conductor between each pair of adjacent busbar sections and normally projecting into the two chambers to connect together the busbar sections therein, each movable conductor comprising an insulated carrier arranged in one of the two chambers, two conducting arms electrically connected together and pivotally mounted on the carrier, the two arms cooperating respectively with contacts on the neighbouring ends of the two adjacent busbar sections, operating mechanism whereby the two arms can be rocked about their pivots from the operative position, in which they connect the said contacts together, into an isolating position in which they both lie in one chamber, and a device for sealing the orifice between the chambers and from which the movable conductor has been withdrawn.

6. In metal-clad electric switchgear, in combination, a plurality of metal chambers arranged end to end in at least one row, a plurality of busbar sections arranged in the said metal chambers, sectionalising switches whereby the busbar sections are normally connected together to form a closed ring, each sectionalising switch comprising an insulated carrier arranged in one chamber, two conducting arms electrically connected together and pivotally mounted on the carrier, the two arms cooperating respectively with contacts on the neighbouring ends of the two adjacent busbar sections, operating mechanism whereby the two arms can be rocked about their pivots from an operative position, in which they connect the said contacts together, into an isolating position in which they both lie in one chamber, and a device for sealing the orifice between the chambers from which the movable conductor has been withdrawn.

7. In metal-clad electric switchgear the combination with the features claimed in claim 5, of means whereby the two conducting arms, when in their isolating position, can be withdrawn together with the carrier from the busbar chamber.

8. In metal-clad electric switchgear for polyphase circuits, in combination, a plurality of metal busbar chambers arranged end to end to form two separate parallel rows for each phase, a plurality of busbar sections arranged in the said chambers, cross-connections at the ends of the two rows of each phase to complete the busbar ring, sectionalising switches whereby the busbar sections are normally connected together to complete the said ring, and a plurality of circuit-breakers through which external circuits can be T-connected to the busbar sections themselves between the sectionalising switches which, when closed, cooperate with the busbar sections to form in each row a continuously straight busbar.

9. In metal-clad electric switchgear, in combination, a plurality of collinear busbar chambers normally in open communication with each other and filled with insulating medium, collinear sections of a sectionalised busbar in the said chambers, a plurality of circuit breakers through which external circuits can be T-connected to the individual busbar sections a sectionalising switch between each pair of adjacent busbar sections, each sectionalising switch comprising a guide member, a conductor electrically connected to the busbar section in one chamber and longitudinally movable within the guide member, and means for moving the conductor along the guide member so that it projects from the first chamber into the adjoining chamber thus connecting the two busbar sections together and for withdrawing the conductor into an isolating position wholly within the first chamber, and means whereby communication between the two chambers can be cut off when the conductor has been withdrawn from the second chamber.

10. The combination with the features set forth in claim 9, of means whereby the longitudinally movable conductor together with the guide member can be removed as a unit from the chamber.

11. In metal-clad electric switchgear, in combination, a chamber containing at least two busbar sections and filled with insulating gas whose dielectric strength within the chamber exceeds that of air at atmospheric pressure, a switch lying wholly within the chamber for connecting the said busbar sections together, the said chamber having an opening through which the switch can be withdrawn as a unit from the chamber, a gas-tight compartment into which the switch can be withdrawn as a unit through the opening, and a device for sealing the opening when the switch has been bodily withdrawn from the busbar chamber into the compartment.

12. In metal-clad electric switchgear, in combination, a plurality of metal chambers arranged end to end in at least two rows, each chamber being filled with insulating gas whose dielectric strength within the chamber exceeds that of air at atmospheric pressure, a plurality of busbar sections arranged in the said chambers respectively, sectionalising switches whereby the busbar sections are normally connected together to form a closed ring, each sectionalising switch comprising two pivoted arms, mechanism for operating the arms from an isolating position in which they lie close together within one chamber to a closed position in which they lie in alignment and are respectively connected to the busbar sections in two adjoining chambers, the sectionalising switch, when in its isolating position, being withdrawable as a unit from the corresponding busbar chamber, a plurality of circuit-breakers through which external circuits are T-connected to the busbar sections between the sectionalising switches which, when closed, cooperate with the busbar sections to form in each row a continuously straight busbar, and gas-tight sealing devices between adjoining busbar chambers, whereby any busbar chamber can be sealed from an adjoining chamber when the corresponding sectionalising switch is in its isolating position.

13. In metal-clad electric switchgear, in combination, a plurality of metal chambers arranged end to end in at least one row, each chamber being filled with liquid insulating medium, a plurality of busbar sections arranged in the said chambers respectively, sectionalising switches within the chambers whereby the busbar sections are normally connected together, each sectionalising switch comprising a guide, a conductor longitudinally movable in the guide, means for effecting longitudinal movement of the conductor within the guide from a position wholly within the chamber into a position in which it makes contact with the busbar section in an adjoining chamber, a plurality of sealing devices between the adjoining chambers respectively whereby a chamber can be sealed from an adjoining chamber when the corresponding isolating switch is in the isolating position, each isolating switch when in its isolating position being withdrawable from the corresponding chamber through an opening therein, and means whereby external circuits can be T-connected to the busbar sections between the sectionalising switches which, when closed, cooperate with the busbar sections to form a continuously straight busbar.

14. In metal-clad electric switchgear, the combination with the features claimed in claim 12, of a plurality of gas-tight compartments registering respectively with the openings in the chambers through which the isolating switches are withdrawable, and sealing devices whereby each of the said compartments can be sealed from the corresponding busbar chamber.

15. In metal-clad electric switchgear, in combination, a plurality of metal chambers arranged end to end in at least one row, each chamber being filled by a gaseous stable halogenated paraffin which is gaseous at ordinary atmospheric temperatures and wherein at least a substantial part of the substituted halogen is fluorine, a plurality of collinear busbar sections arranged in the said chambers respectively, sectionalising switches between the busbar sections, means for connecting the end busbar sections in the row whereby when the sectionalizing switches are closed the busbar sections are connected together to form a closed ring, and a plurality of circuit-breakers through which external circuits can be T-connected to the busbar sections themselves between the sectionalising switches, each sectionalising switch having a movable switch member which in the closed position lies in line with the busbar sections to form therewith in the row a continuously straight busbar.

ARCHIBALD ALLAN.
FRANK COATES.